(12) United States Patent
Stevens

(10) Patent No.: US 6,486,916 B1
(45) Date of Patent: Nov. 26, 2002

(54) ELECTRONIC RECORDING CAMERA WITH OPTIMIZED POWER CONSUMPTION

(76) Inventor: John Herbert Stevens, 8510 Beechgrove Rd., Martinsville, IN (US) 46151

( * ) Notice: Subject to any disclaimer, the term of this patent is extended or adjusted under 35 U.S.C. 154(b) by 0 days.

(21) Appl. No.: 08/860,536

(22) PCT Filed: Dec. 8, 1995

(86) PCT No.: PCT/US95/16211

§ 371 (c)(1),
(2), (4) Date: Jun. 30, 1997

(87) PCT Pub. No.: WO96/21318

PCT Pub. Date: Jul. 11, 1996

(30) Foreign Application Priority Data

Jan. 5, 1995 (GB) .............................................. 9500178

(51) Int. Cl.[7] .............................................. H04N 9/04
(52) U.S. Cl. ...................................... 348/372; 348/207
(58) Field of Search ................................. 348/372, 376, 348/220, 357, 345, 346, 207, 222, 211, 730; 358/906; 386/46; 396/303

(56) References Cited

U.S. PATENT DOCUMENTS

| | | |
|---|---|---|
| 4,531,164 A | 7/1985 | Maeda et al. ............... 360/33.1 |
| 4,740,828 A | 4/1988 | Kinoshita ..................... 358/48 |
| 4,945,424 A | 7/1990 | Hiroki et al. ............... 358/335 |

(List continued on next page.)

FOREIGN PATENT DOCUMENTS

| | | |
|---|---|---|
| EP | 066776 | 12/1982 |
| JP | 9133274 | 7/1984 |
| JP | 60-098584 | 6/1985 |
| JP | 63-62486 | 3/1988 |
| JP | 1-080175 | 3/1989 |
| JP | 1190770 | 7/1989 |
| JP | 3060290 | * 3/1991 .......... H04N/5/782 |
| JP | 4226175 | 8/1992 |
| JP | 578611 | 3/1993 |
| JP | 51-83855 | 7/1993 |
| JP | 52-07339 | 8/1993 |
| JP | 6220377 | 8/1994 |
| JP | 6248211 | 9/1994 |
| JP | 6271802 | 9/1994 |
| JP | 6-292062 | 10/1994 |
| JP | 790211 | 4/1995 |
| JP | 7196934 | 8/1995 |
| JP | 8325493 | 12/1996 |

OTHER PUBLICATIONS

Patent Abstracts Of Japan, vol. 017, No. 601 & JP 5–183855.
Patent Abstracts Of Japan, vol. 013, No. 301 & JP 1–080175.
Patent Abstracts Of Japan, vol. 017, No. 646 & JP 5–207339.
Patent Abstracts Of Japan, vol. 009, No. 246 & JP 60–098584.
Patent Abstracts Of Japan, vol. 94, No. 010 & JP 6–292062.
Patent Abstracts Of Japan, vol.012, No. 287 & JP 63–062486.

*Primary Examiner*—Wendy R. Garber
*Assistant Examiner*—Jacqueline Wilson

(57) ABSTRACT

A video camera recorder comprises an imaging means receiving an optical image and generating an image representative video signal, and a viewfinder for viewing the optical image. A synchronizing signal generator is coupled to the imaging means and to a recording means which is coupled to the imaging means. A control means for optimizing power conservation has a first mode which enables operation of the synchronizing signal generator and inhibits operation of the imaging and recording means. In a second mode the control means enables the synchronizing signal generator and recording means for reproducing a recorded image representative video signal and inhibits operation of the imaging means. In a third mode the control means enables the imaging means, the synchronizing signal generator and the recording means for recording the image representative video signal from the imaging means.

12 Claims, 3 Drawing Sheets

U.S. PATENT DOCUMENTS

| | | | | |
|---|---|---|---|---|
| 5,063,458 A | * | 11/1991 | Fukushima et al. | 348/372 |
| 5,099,364 A | * | 3/1992 | Kawabata | 348/372 |
| 5,313,305 A | * | 5/1994 | Harigaya et al. | 348/372 |
| 5,412,425 A | * | 5/1995 | Nagano | 348/372 |
| 5,465,133 A | * | 11/1995 | Aoki et al. | 348/220 |
| 5,486,852 A | * | 1/1996 | Arai | 348/211 |
| 5,710,597 A | * | 1/1998 | Tamaki et al. | 348/372 |
| 5,970,202 A | * | 10/1999 | Takei et al. | 386/46 |
| 6,111,609 A | * | 8/2000 | Stevens | 348/372 |

* cited by examiner

ELECTRONIC RECORDING CAMERA WITH OPTIMIZED POWER CONSUMPTION

This invention is directed to the field of portable electronic recording cameras and in particular to the reduction of power consumption and manufacturing costs.

BACKGROUND OF THE INVENTION

Video recording cameras, or camcorders, typically utilize a solid state imager. The imager generates an image signal which is processed to form a video signal for television viewing or recording. Typically a camcorder includes a viewing device, or viewfinder, for viewing the scene, which may additionally be utilized for reviewing recorded material. The recording section may utilize a magnetic tape recording medium, magnetic disk, or solid state memory. The complete camera and recorder may be battery powered, often by a rechargeable battery.

A typical camcorder is illustrated in FIG. 1, and may be considered to comprise the major functional blocks shown. A zoom lens 100 is provided to gather illumination from a scene, and form a focused image on an imaging device 205. The zoom lens 100, usually provides control of three parameters namely, focus 110, zoom or magnification 120, and iris or aperture 130. Control of these optical parameters are usually facilitated by physical movement of constituent parts within the lens. For example, the iris or lens opening may be provided by a multi-blade diaphragm, zoom and focus may be facilitated by the repositioning of internal lenses. Often such mechanical movements are provided by electrically powered motors, frequently servo controlled to provide automatic optimization of the controlled parameter.

Imaging device 205, may for example be a charge coupled device or CCD, depicted FIG. 1 as part of a video signal generator 200. The video signal generator processes signals received from the CCD to stabilize black and white levels therein, to automatically control white balance, and to pre-correct or gamma correct the generated video signal for cathode ray tube, CRT, viewing. In addition processing is provided to enhance picture sharpness and to provide servo control signals for coupling to the lens for focus and iris control.

The processed video signals are encoded by encoder 300, which produces a standard color signal for television viewing. In addition a video signal is generated for coupling to a viewfinder 50. Luminance and encoded color subcarrier signals are generated by the encoder and record processed by amplifier 505 which is coupled to heads on head drum 510.

Recorder 500 is depicted as a magnetic tape recorder, utilizing a rotating head assembly or drum 510 comprising, for example, record, replay and erase heads. A capstan 520 with pinch roller 530 is employed to move the recording medium. Recorder 500 is shown loaded and threaded with tape 504 withdrawn from tape cassette 501 by threading mechanism and motor 527. The cassette comprises a tape supply reel 502 and a take up reel 503. Head drum 510 is rotated by motor 515 and is synchronized with the video signal, similarly capstan 520 is rotated by motor 525 which is also synchronized with the video signal.

The luminance and coloring signals are processed by a record and play back amplifier 505 which generates signals for recording and reproduction by heads mounted on the periphery of head drum 510. Reproduced signals from amplifier 505 are coupled to encoder 300 for viewfinder viewing and for processing to form a standard TV signal.

The camcorder is controlled by a microprocessor 400 which operates in conjunction with a recorder mechanism controller 560.

Audio signals are captured by a microphone 70 and amplified by amplifier 75. In addition amplifier 75 may generate an audio modulated signal for recording and include a demodulator for audio reproduction and output coupling.

Camcorder 10 is powered by a battery 600, which for example, may be a rechargeable type having a nickel cadmium structure. Typically camcorders may function as a recording camera, or a VCR play back device. Battery power consumption is greatest when recording, and increases further with frequency of zoom lens and iris operation. Often a record pause mode is provided which allows recording to be halted and resumed without a visible replay disturbance. However, this mode frequently provides only minimal power savings, since in order to provide rapid resumption of recording, the head drum motor and capstan pinch roller often remain powered.

It is desirable that camcorder power consumption be reduced, for example, to provide increased operating time with a specific battery size or chemistry. Reduced power consumption may also, for example, allow the use of physically smaller batteries yielding a smaller or lighter camcorder. Reduced power dissipation may also permit camcorder operation with non-rechargeable or other battery chemistries, for example alkaline cells.

Clearly electronic circuit changes may offer opportunities for power reduction. However, both the viewfinder and the sustained synchronous rotation of the head drum and capstan motors represent the major sources of power dissipation. Hence, a significant reduction in power consumption may be achieved only if a corresponding reduction or compromise in operational facilities, camcorder operability, and user convenience is deemed acceptable.

SUMMARY OF THE INVENTION

A video camera recorder comprises an imaging means receiving an optical image and generating an image representative video signal. A viewfinder for viewing the optical image and a means for generating synchronizing signals is coupled to the imaging means. A recording means is coupled to the synchronizing signal generating means and to the imaging means. A control means for optimizing power conservation, has a first mode of operation in which the control means enables operation of the synchronizing signal generating means and inhibits operation of the imaging means and the recording means, and has a second mode of operation in which the control means enables operation of the synchronizing signal generating means and the recording means for reproducing a recorded image representative video signal and inhibits operation of the imaging means.

DETAILED DESCRIPTION

Figure 1:
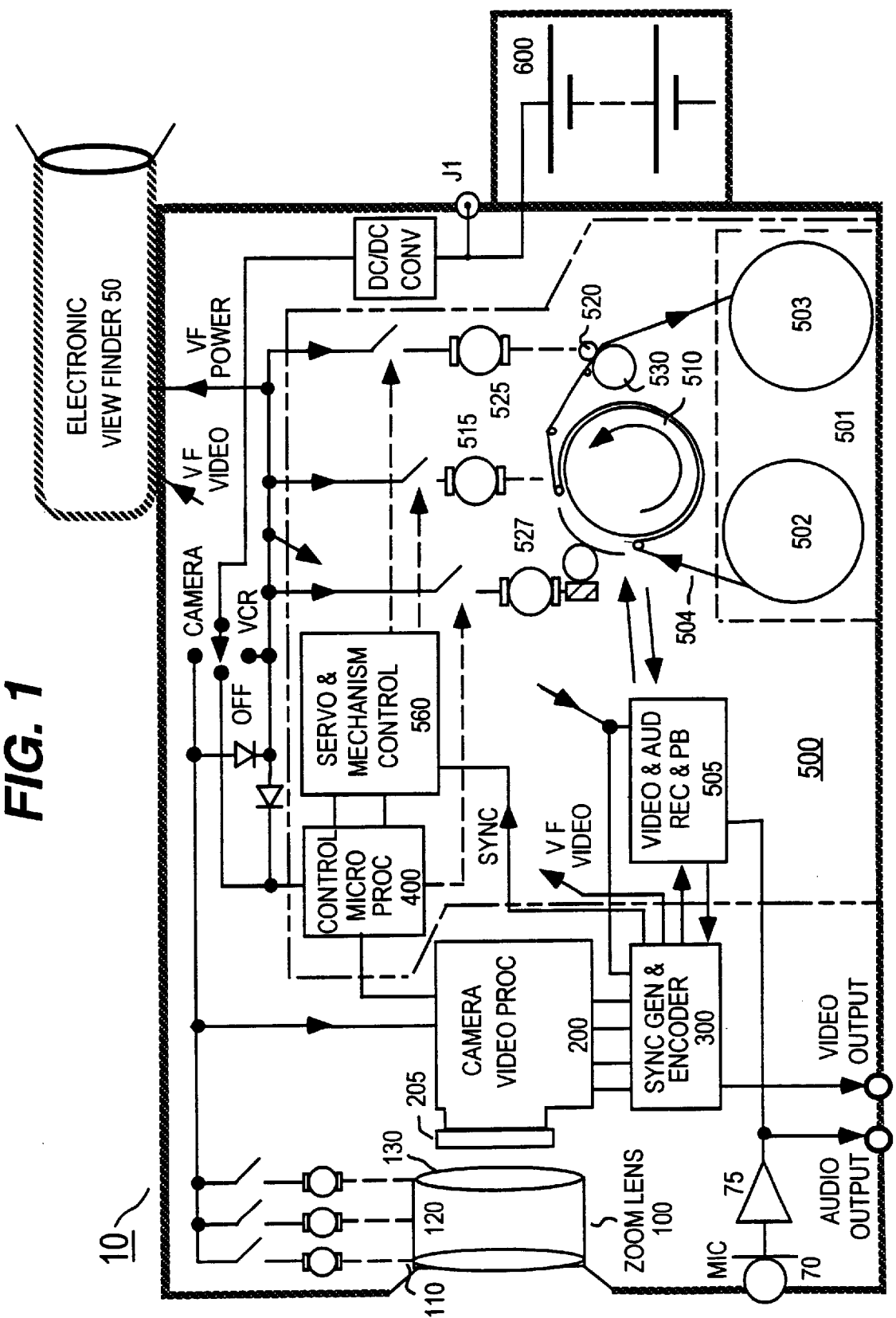
FIG. 1 is a block diagram of a video recording camera.

The video recording camera depicted in the block diagram of FIG. 1 shows magnetic tape 504 threaded around the periphery of head drum 510 to facilitate either recording or reproduction. Typically two operating modes are provided, namely CAMERA and VCR. The VCR mode allows reproduction from tape 504 and provides a replayed video signal for viewfinder display and an output signal to permit the external review of a recorded video signal on a video monitor or television receiver. The CAMERA mode may, for example, be considered to comprise three sub-modes, namely imaging a scene, recording the imaged scene and pausing the recording. However, the imaging mode assumes the RECORD paused condition whenever a video tape cassette is loaded. The RECORD pause condition provides the user with the ability to change the recorded scene with the camcorder able to rapidly resume recording without a discontinuity in the recorded signal. Typically when the RECORD pause mode is selected the recording process may be sustained with record amplifiers powered, and the cylinder motor rotating in a synchronized condition. However, the tape is stationary with the capstan pinch roller energized and capstan rotation stopped. Hence, although the RECORD pause mode provides user operational convenience, it may offer little saving in power consumption from that dissipated during recording.

In FIG. 1 control microprocessor 400 is illustrated connected to battery 600 in all camcorder modes. When the camcorder is OFF this connection represents the major source of battery drain or discharge and is typically considerably greater than the battery internal self discharge. Typically this microprocessor connection is provided to allow remotely controlled activation or to permit tape cassette ejection without turning the camcorder ON.

Figure 2:
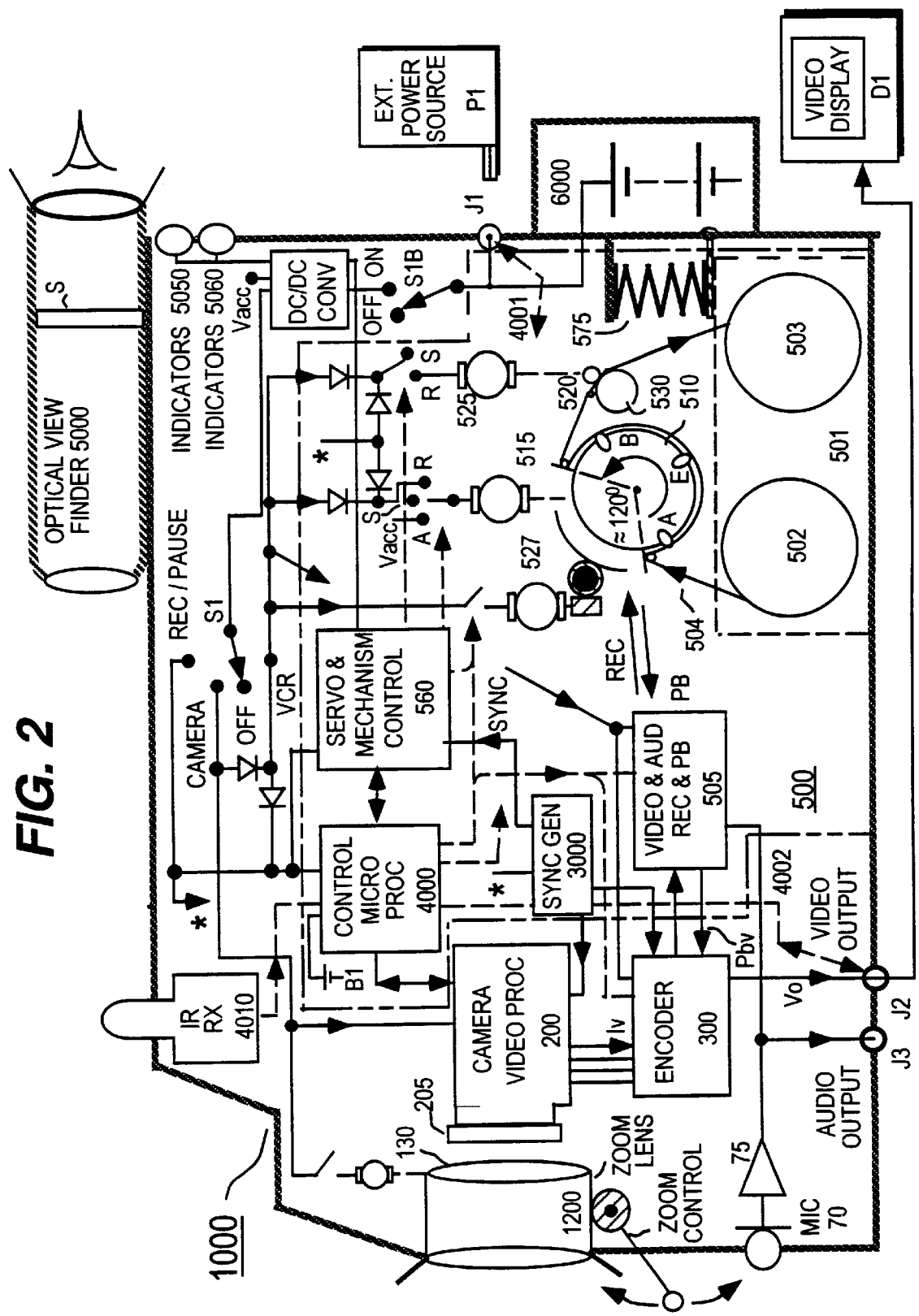
FIG. 2 depicts in block diagram form a video recording camera having various inventive features.

FIG. 2 is a block diagram of an advantageous video recording camera 1000 embodying various inventive features. Elements common to both FIGURES use the same numbers. In FIG. 2, a manually operated zoom lens 1200 is illustrated having, for example, a lever coupled via gears to vary zoom lens magnification. The provision of manual zoom operation, reduces both power consumption, and lens cost. In the manual zoom lens, focus element 110 may no longer be required since the imager size is small, for example 0.25", with a correspondingly short back focal length, thus fixed focus operation may be achieved. The use of a fixed focus lens further reduces the lens cost and eliminates the need for a focus servo mechanism. The elimination of the focus servo mechanism eliminates focus servo amplifiers and circuitry associated with automatic focus control, thus further reducing both power consumption and product cost. Although the zoom lens is manually operated with fixed focus, an iris diaphragm 130 and servo control loop may be utilized to provide automatic control of video level.

In FIG. 2 an optical viewfinder 5000 is illustrated. Viewfinder 5000 may be optically or mechanically coupled to the zoom lens to provide the user with ostensibly the same view and magnification as that imaged. Alternatively a viewfinder may be utilized without lens coupling where the relative image sizes for various zoom magnifications are indicated by an eye piece graticule or by engraving on a viewing screen S.

Figure 3:
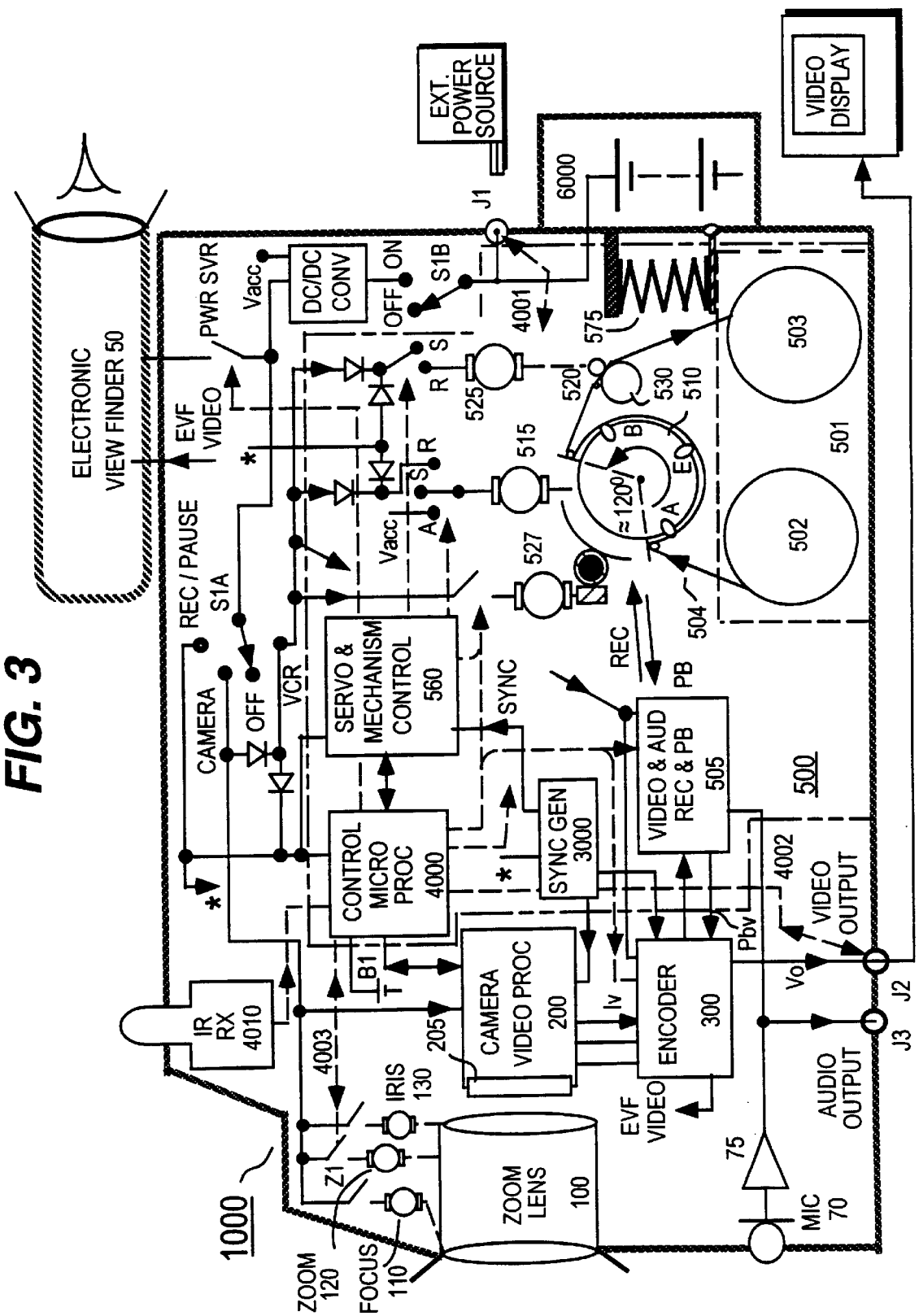
FIG. 3 depicts in block diagram form an inventive video recording camera with electronic viewfinder.

Camcorder 1000 is advantageously powered by battery 6000 which may, for example, comprise primary cells, or primary cells capable of recharging. The use of primary cells, for example, alkaline chemistry cells, permits camcorder operation in situations where battery charging or charger power is unavailable. Alkaline batteries for example, offer user benefits of convenience and wide availability plus extended operational flexibility. Camcorder 1000 may also be powered by conventional rechargeable cells, for example NiCd or lead acid. In addition the camcorder may be powered from an external power source, for example, an AC powered supply or automobile battery coupled via connector J1. The microprocessor may detect the coupling of an external power supply and modify or adapt power reduction rationales commensurate with the potentially abundant source of external power. In FIGS. 2 and 3, a DC to DC converter is depicted coupled between the battery and the camcorder loads, however various of the loads, for example, the motors, may be controllably coupled directly to the unregulated battery supply.

The use of primary cell power is predicated on advantageous power reduction methods employed in camcorder 1000. As has been described, useful power savings may be gained from the use of a manually operated zoom lens with a fixed focal length. The manual zoom lens may compromise user operational features, but eliminates battery power dissipation resulting from frequent, and often unnecessary powered zoom operation. In addition, the zoom drive motor and associated circuitry are eliminated together with the focus motor, and auto focus servo system. The use of an optical viewfinder may provide similar savings in terms of both power dissipation and cost.

FIG. 2 illustrates a power switch S1 which provides selection between VCR only operation or camera and VCR operation. Switch S1 also shows a RECORD/RECORD pause mode, however the RECORD/RECORD pause mode is usually associated with a separate RECORD push button or switch. Switch S1 depicts the RECORD pause condition to illustrate selective powering of certain circuit functions during the RECORD pause condition.

Usually when a camcorder is turned off, current continues to be drawn from an attached battery, until discharged below the operating voltage of range of the camcorder power supply and ultimately the memory retention potential of the microprocessor system. This battery discharge current usually supplies the microprocessor and is significantly greater than the self discharge currents within the battery. Microprocessor power is sustained to enable, for example, remotely controlled camcorder activation or tape cassette ejection. In inventive camcorder 1000, external current drain from an attached battery is eliminated when mode control switch S1 is in the OFF position. Thus the microprocessor is nominally off and no longer powered from an attached battery, this eliminates remote controlled activation by IR receiver 4010, and requires that the camcorder is ON in either the CAMERA or VCR mode in order for cassette ejection. When the camcorder is turned OFF, a clock function and memory associated with the control microprocessor 4000 may be sustained by a small internal, rechargeable battery, such as a lithium cell. In addition camcorder 1000 may provide a mechanical tape cassette ejector for use when power is unavailable. The ejection mechanism may, for example, be spring powered where an ejector spring is coiled or cocked by previous manual cassette insertion. Following emergency mechanical cassette ejection, the ejection mechanism must be reprimed by manually loading a cassette before normal camcorder operation is possible. The trigger mechanism for emergency cassette ejection may concealed and is mechanically interlocked to prevent ejection with the tape threaded. In addition whenever VCR assumes an OFF condition the tape is unthreaded and returned to the cassette.

Analysis of camcorder power consumption reveals that the RECORD mode dissipates most power. Clearly, the RECORD mode requires operation of both imaging and recording parts of the camcorder. The camera converts an image into a video signal, and the recorder transports the tape between the reels and powers a synchronized rotating head drum for recording.

In many camcorders the power dissipated when RECORD paused is similar to that of the RECORD mode. However, the RECORD pause mode of advantageous camcorder 1000 may be configured to greatly reduce power dissipation. Since an optical viewfinder is employed, there is no camcorder display destination for image video. Hence there is no requirement or need to image the scene and generate a corresponding video signal until the user selects the RECORD mode. Thus, imager 205 and camera video processing section 200 may be advantageously activated and dissipate battery power, only during the RECORD mode. Similarly encoder 300 may be fully powered during recording, powered down during RECORD pause, and may be partially powered to form an output video signal in a VCR playback mode.

The power reduction method described for the RECORD pause mode may yield further power savings if additional operational compromises are acceptable. For example, currently when RECORD paused the capstan motor may be stopped with the pinch roller engaged, however the head drum continues to be powered and synchronized. Stopping the head drum in a RECORD pause mode may yield power savings. However, an attendant operational compromise results in that the resumption of recording may be delayed until the head drum is synchronized. Such an operational compromise may be acceptable if of sufficiently short duration, for example, about 2 seconds. Such a recording delay may be largely inconsequential in most user circumstances, and may be signaled to the user by illuminating or changing the condition of an indicator, for example, flashing indicators 5050 or 5060 during record synchronization.

Certain video recording formats employ a technique known as back space editing where at the cessation of recording the direction of tape travel is reversed, and backed up a predetermined distance, played and then stopped. On receipt of a user record trigger the previously recorded tape section is replayed and tracking set prior to over recording the last few tracks of the previous record. A further opportunity for power saving may result from halting drum rotation at the cessation of recording and reversing the tape direction as described but then halting tape motion. Thus the tape is backed up the same distance and power is saved by stopping head drum and not moving the tape forward as described. However, on receipt of the user's record trigger the drum motor must be started, and synchronization achieved prior to setting tracking. In addition the capstan must move the tape to a predetermined location to start over recording. Typically the tape is backed up about 112 tracks, and moved forward about 76 tracks prior to parking in the RECORD paused condition. When record triggered the tape is replayed for about 30 tracks to set tracking, prior to the start of over recording. Thus a duration of about 106 recorded tracks is available to synchronize the drum motor, move the tape and recover tracking information. By changing the back space edit sequence when RECORD paused, significant savings in drum motor dissipation may result with only a minimal increase in recording start delay. Typically the start of recording is delayed by about 30 fields, this delay would become about 106 fields with the proposed method. To reduce drum motor synchronization time an acceleration power supply Vacc may be switched to power the motor drive amplifiers during a start period. FIGS. 2 and 3 show a three position switch connected to head drum motor 515, an actual realization of the switch functions may be achieved by an integrated circuit motor drive amplifier. However, the three positions illustrated represent a stop mode S, run mode R and an acceleration mode A. Following receipt of the record trigger the higher voltage power supply Vacc is applied during an initial period, for example one second, or until synchronous rotation is achieved, after which time the normal run mode supply voltage is restored. The transition from the acceleration supply to the run supply may be arranged to ramp down in order to avoid unnecessary additional, or lengthened servo lock up time. The use of a higher voltage acceleration supply Vacc may provide drum synchronization times which may enable the delay of 106 fields to be reduced, for example the tape may be backed up a shorter distance than the current 112 tracks.

Further consideration of camcorder 1000 suggests that the use of a manual, focus free zoom lens and optical viewfinder, may allow the camera image generation and processing section to be powered only in the RECORD mode. This power saving rationale may result in a compromise where the camera generates only a recording video signal, for example Y and C. An encoded video output signal may be unavailable from the camera during RECORD or RECORD paused modes. A standard encoded video output signal may be generated only during VCR replay, or from the camera when a tape cassette is not loaded.

In FIG. 2 head drum 510 is depicted with heads A, B and E, typically heads A and B are utilized for both recording and reproduction with head E providing erasure. Heads A and B are positioned on the drum nominally 180 degrees apart, and by virtue of the angle of tape 504 wrapped around the drum, provide periods when a single head A or B is in contact with the tape, and other times when both beads contact the tape. However, when recording, during periods of single record head contact the other record head, and associated record amplifier are uselessly generating a recording field directed into fresh air. Record amplifier power dissipation may be reduced by turning off, or gating each head and associated record amplifier during periods of non-tape contact. However, the timing of this record gating must permit the required tape edge overlap periods to be recorded. In FIGS. 2 and 3 an exemplary non-tape contact angle of about 120 degrees is illustrated, hence a gated record amplifier may provide a power saving of about 30%. During a RECORD paused condition both recording amplifiers may be turned off thus providing a further power saving.

Clearly not all electronic systems within camcorder 1000 can be powered down and still provide the user with an acceptably short recording start time. For example, in FIG. 2, camcorder 1000 is depicted with the control microprocessor 4000, sync generator 3000 and servo mechanism 560 powered in all modes, but controlled responsive to microprocessor 4000. If camcorder 1000 is RECORD paused and a RECORD command is received by microprocessor 4000, the various quiescent systems may be sequentially powered up. For example, to maintain synchronizing pulse stability sync generator 3000 is continuously powered generating sync pulses, power may be applied to the head drum motor 515 and capstan motor 525 to initiate synchronized rotation. The head drum motor lockup time may largely determine the delay in RECORD initiation following an un-pause command. Following motor starting, power may be reapplied to the camera video processor 200 and finally, immediately prior to motor synchronization, power may be reapplied to the video and audio record amplifier 505.

In the exemplary camcorder illustrated in FIG. 3, useful power savings may be achieved by advantageous control of power dissipating loads. For example, a monochrome electronic viewfinder typically employs a cathode ray tube and dissipates just under 1 watt, a color display uses a liquid crystal display with dissipation of slightly more than 1 watt. Hence in a typical camcorder with a total dissipation of approximately 5 watts, useful power savings may be achieved by turning off the viewfinder. However, such power savings may impose operational constraints for the user. Camcorder usage suggests that there are periods when the viewfinder may be powered down providing it may be simply, quickly and automatically reactivated. For example, in a RECORD paused condition, the next wanted scene or image may not occur for some period of time. Hence an exemplary 30 second timer may be set when entering the RECORD paused condition, and if the RECORD mode is resumed within the 30 second period, the timer is reset. However, if the timer is not reset within the 30 second period the viewfinder is automatically turned off. The viewfinder may be turned on by touching any camcorder control, for example, activation of zoom motor 120 may be sensed via coupling 4003. Typically both monochrome and color displays are operable from power on in about 1 second.

Microprocessor 4000 may advantageously monitor external interfaces to the video recording camera, where such external interfaces may comprise user controls and switches, and video, audio and power connectors. For example, microprocessor 4000 may sense the status of the video output connection via coupling 4002. The presence of coupling to an external video display device may be detected and in response the electronic viewfinder may be deactivated by the microprocessor. Disconnection of the external display device immediately restores viewfinder operation.

Microprocessor 4000 normally monitors the status of user controls and switches in order to effect the desired user command, however in addition, these external interface commands may be utilized for adaptively controlling power dissipation within the video recording camera. For example, selection of a replay mode may automatically deactivate the electronic viewfinder during replay of unrecorded tape segments. For example, when replaying or picture searching, following a loss of recorded signals for a predetermined period, the electronic viewfinder is automatically deactivated. The automatic deactivation may for example, result from detecting the absence of sync pulses or the presence of a large amplitude random noise signal. The viewfinder is automatically reactivated with the return of reproduced video, camera video, or at the touch of any camcorder control.

An external power source may be coupled to the camcorder via external interface connector J1. The presence of the external coupling may be sensed by exemplary connection 4001, and in response microprocessor 4000 may adaptively determine the degree of power conservation employed by the camcorder. For example, in a RECORD pause condition the presence of external power source may permit sustained operation of various servo controlled motor systems thereby reducing delay in resuming a recording mode.

Automatic optical focusing may be required as the image magnification is changed during zooming. Thus the auto focusing system may advantageously powered to adjust and optimize focus only when the zoom control is activated. However, such an auto focusing control rationale may be defeated, hence auto focusing may also be activated by changes in scene brightness, possibly being indicative of change within the scene, and indicated by an auto iris or AGC signal change. By means of selective de-powering unnecessary focus variation is avoided with a consequential power saving. However situations requiring auto focus control are identified and activate the auto focus control servo. This auto focus power saver may be defeated by the user.

What is claimed is:

1. A video camera recorder comprising:

an imaging means receiving an optical image and generating an image representative video signal;

a viewfinder for viewing said optical image;

means for generating synchronizing signals coupled to said imaging means;

recording means coupled to said synchronizing signal generating means and to said imaging means; and, a control means for optimizing power conservation, having:

a first mode of operation in which said control means enables operation of said synchronizing signal generating means and, inhibits operation of said imaging means and said recording means;

a second mode of operation in which said control means enables operation of said synchronizing signal generating means and said recording means for reproducing a recorded image representative video signal and inhibits operation of said imaging means; and a third mode of operation in which said control means, enables operation of said imaging means, said synchronizing signal generating means and said recording means for recording said image representative video signal from said imaging means.

2. The video camera recorder (1000) of claim 1, wherein said control means (4000) has third mode of operation in which said control means (4000), enables operation of said imaging means (205,200), said synchronizing signal generating means (3000) and said recording means (500) for recording said image representative video signal (Iv) from said imaging means (205,200).

3. The video camera recorder of claim 1, wherein responsive to a power off selection said control means turns off said video camera recorder and disconnects a battery power source coupled to said video camera recorder.

4. The video camera recorder of claim 1, wherein responsive to a power off selection said control means inhibits loading and unloading of a recording media cassette.

5. The video camera recorder of claim 1, wherein responsive to a power off selection said control means inhibits remote control.

6. The video camera recorder of claim 1, wherein said first mode of operation in which said control means enables loading and unloading of a recording media cassette.

7. The video camera recorder of claim 1, wherein said third mode of operation in which said control means delays initiation of recording responsive to synchronization of said recording means.

8. The video camera recorder of claim 7, wherein said recording delay is visually indicated.

9. The video camera recorder of claim 1, wherein said third mode of operation, in which said control means enables a recording amplifier of said recording means to record said image representative video signal during a first predetermined part of a rotational period of a recording head and inhibits said recording amplifier during a remaining part of said rotational period.

10. The video camera recorder of claim 9, wherein said first predetermined part represents a time of contact between said recording head and a recording media.

11. The video camera recorder of claim 9, wherein said remaining part of said rotational period represents a time of separation between said recording head and a recording media.

12. The video camera recorder of claim 1, wherein said control means enables generation of an output video signal only in said second mode of operation.

* * * * *

UNITED STATES PATENT AND TRADEMARK OFFICE
CERTIFICATE OF CORRECTION

PATENT NO. : 6,486,916 B1
DATED : November 26, 2002
INVENTOR(S) : John Herbert Stevens It is certified that error appears in the above-identified patent and that said Letters Patent is hereby corrected as shown below:

Title page,
Item [56], References Cited, FOREIGN PATENT DOCUMENTS, delete the following:
"1190770    Jul., 1989    JP
4226175    Aug., 1992    JP
578611    Mar., 1993    JP
6220377    Aug., 1994    JP
6248211    Sep., 1994    JP
6271802    Sep., 1994    JP
790211    Apr., 1995    JP
7196934    Aug., 1995    JP
8325493    Dec., 1996    JP".
Insert Items:
-- [73] Assignee: Thomson Licensing, S.A., Boulognecedex, France (FR) --; and
-- [74] *Attorney, Agent or Firm* - Joseph S. Tripoli, Harvey D. Fried, Francis A. Davenport --.

Signed and Sealed this

Twenty-eighth Day of February, 2006

JON W. DUDAS
*Director of the United States Patent and Trademark Office*